US008484382B2

(12) United States Patent
Das et al.

(10) Patent No.: US 8,484,382 B2
(45) Date of Patent: Jul. 9, 2013

(54) METHODS AND APPARATUS FOR MERGING PEER-TO-PEER OVERLAY NETWORKS

(75) Inventors: Saumitra Mohan Das, San Jose, CA (US); Lakshminath Reddy Dondeti, Hyderabad (IN); Vidya Narayanan, San Diego, CA (US); Ranjith S. Jayaram, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 620 days.

(21) Appl. No.: 12/720,569

(22) Filed: Mar. 9, 2010

(65) Prior Publication Data

US 2010/0332683 A1    Dec. 30, 2010

Related U.S. Application Data

(60) Provisional application No. 61/159,371, filed on Mar. 11, 2009.

(51) Int. Cl.
*G06F 15/16* (2006.01)
(52) U.S. Cl.
USPC ............ 709/249; 709/224; 709/227; 370/254
(58) Field of Classification Search
USPC ........... 709/200–203, 217–227, 249; 370/254
See application file for complete search history.

(56) References Cited

U.S. PATENT DOCUMENTS

| | | | |
|---|---|---|---|
| 7,401,132 B1 * | 7/2008 | Krumel et al. ................. 709/220 |
| 7,613,796 B2 * | 11/2009 | Harvey et al. ................. 709/220 |
| 7,643,426 B1 * | 1/2010 | Lee et al. ....................... 370/238 |
| 7,782,867 B2 * | 8/2010 | Suzuki et al. ............. 370/395.31 |
| 7,970,935 B2 * | 6/2011 | Yanagihara .................... 709/244 |
| 2004/0054807 A1 * | 3/2004 | Harvey et al. ................. 709/243 |

FOREIGN PATENT DOCUMENTS

EP    1398924 A2    3/2004

OTHER PUBLICATIONS

Anwitaman Datta, et al., "The Challenges of Merging Two Similar Structured Overlays: A Tale of Two Networks" Jan. 1, 2006, Self-Organizing Systems Lecture Notes in Computer Science;;LNCS, Springer, Berlin, DE, pp. 7-22, XP019042040 IS.
Ganesan P, et al., "Canon in G major: designing DHTs with hierarchical structure" Distributed Computing Systems, 2004. Proceedings. 24th International C Onference on Hachioji, Tokyo, Japan Mar. 24-26, 2004, Piscataway, NJ, USA,IEEE LNKDD01: 10.1109/ICDCS.2004.1281591, Mar. 24, 2004, pp. 263-272, XP010692673 ISBN: 978-0/7695-2086-5 paragraph [02.1].

(Continued)

*Primary Examiner* — Moustafa M Meky
(74) *Attorney, Agent, or Firm* — Kristine U. Ekwueme

(57) ABSTRACT

Methods and apparatus for merging peer-to-peer overlay networks. A method includes receiving an advertisement from a second overlay network, determining a size of the second overlay network, performing a self search on the second overlay network based on a persistent node identifier, if the size of the second overlay network is greater than the size of a first overlay network, and joining the second overlay network if the persistent node identifier is not part of the second overlay network. An apparatus includes a transceiver to receive an advertisement from a second overlay network, and a processor coupled to the transceiver to determine a size of the second overlay network, perform a self search on the second overlay network based on a persistent node identifier, and join the second overlay network if the persistent node identifier is not part of the second overlay network.

32 Claims, 6 Drawing Sheets

OTHER PUBLICATIONS

International Search Report and Written Opinion—PCT/US2010/027051, International Search Authority—European Patent Office—Sep. 6, 2010.

Stoica I, et al., "MIT-LCS-TR-819—Chord: A Scalable Peer-to-peer Lookup Service for Internet Applications" Internet Citation Mar. 23, 2001, XP002328538 Retrieved from the Internet: URL:http://www.lcs.mi t.edu/publi cati ons/pu bs/ps/MIT-LCS-TR-819.ps> [retrieved on May 17, 2005] paragraph [04.4]-paragraph [4.4.1].

Tallat M Shafaat, et al., "Handling Network Partitions and Mergers in Structured Overlay Networks" Seventh IEEE International Conference on Peer-To-Peer Computing, 2007. P2P 2007. Sep. 2-5, 2007, Galway, Ireland, IEEE, Piscataway, NJ, USA, Sep. 1, 2007, pp. 132-139, XP031142541 ISBN: 978-0-7695-2986-8 paragraph [0001]-paragraph [03.2].

Yunfei Zhang, et al., "On the union of chord-like networks" Services Computing, 2004. (SCC 2004). Proceedings. 2004 IEEE Internati Onal Conference on Shanghai, China Sep. 15-18, 2004, Piscataway, NJ, USA,IEEE LNKDDOI: 10.1109/SCC.2004.1358059, Sep. 15, 2004, pp. 536-540, XP010741577 ISBN: 978-0-7695-2225-8 paragraph [0001]-paragraph [02.2].

* cited by examiner

METHODS AND APPARATUS FOR MERGING PEER-TO-PEER OVERLAY NETWORKS

CLAIM OF PRIORITY UNDER 35 U.S.C. §119

The present application for patent claims priority to Provisional Application No. 61/159,371 entitled "Methods and Apparatus for Merging Structured Peer-to-Peer Overlay Networks" filed Mar. 11, 2009, and assigned to the assignee hereof and hereby expressly incorporated by reference herein.

BACKGROUND

1. Field

The present application relates generally to the operation of overlay networks, and more particularly, to methods and apparatus for merging peer-to-peer overlay networks.

2. Background

A network in which member nodes obtain services in the absence of server-based infrastructure is referred to herein as a "peer-to-peer overlay network" (or "p2p overlay network" or "overlay network" or simply "overlay"). Peer-to-peer overlay networks can be built on top of an underlying network, such as a network utilizing the Internet Protocol (IP). Overlay networks can consist of a few nodes to thousands of nodes joined together in a logical routing structure. Individual nodes often participate in routing and maintenance aspects of the overlay.

Typically, an overlay network is formed through an enrollment and joining process as defined by the overlay protocol. Once a node joins the overlay, it assumes ownership of some part of the routing space and performs routing functionality to enable communication among all possible pairs of nodes in the overlay. Specifically, in overlay networks based on structured DHTs (distributed hash tables), a node also assumes ownership of some part of the data items stored in the overlay.

However, overlay networks sometimes form in a disjoint manner due to the limited scope of advertisements for such networks. In such situations, it is important to merge such overlay networks into one larger overlay network so that the participating nodes in each disjoint overlay network can have access to the resources and services of a more complete set of nodes. Unfortunately, conventional systems fail to provide an efficient mechanism to merge overlay networks. For example, conventional systems typically assign new node identifiers as nodes are merged from a first overlay network to a second overlay network. This results in extensive overhead messaging and data item movement because data ownership depends on node identifiers, and changes upon merging.

Therefore, it would be desirable to have a simple and efficient mechanism that operates to allow overlay networks to merge and therefore avoid the problems associated with conventional systems.

SUMMARY

In one or more implementations, an overlay merging (OM) system, comprising methods and apparatus, is provided that operates to allow overlay networks to merge, thereby providing participating nodes access to the resources and services of a more complete set of nodes.

In an aspect, a method is provided for merging a first node in a first peer-to-peer overlay network with a second peer-to-peer overlay network. The method comprises receiving an advertisement from a selected node in the second overlay network, determining a size of the second overlay network, performing a self search on the second overlay network based on a persistent node identifier associated with the first node, if the size of the second overlay network is greater than a size of the first overlay network, and joining the second overlay network if the self search determines that the persistent node identifier is not part of the second overlay network.

In an aspect, an apparatus is provided for merging a first node in a first peer-to-peer overlay network with a second peer-to-peer overlay network. The apparatus comprises a transceiver configured to receive an advertisement from a selected node in the second overlay network, and a processor coupled to the transceiver and configured to determine a size of the second overlay network, perform a self search on the second overlay network based on a persistent node identifier associated with the first node, if the size of the second overlay network is greater than a size of the first overlay network, and join the second overlay network if the self search determines that the persistent node identifier is not part of the second overlay network.

In an aspect, an apparatus is provided for merging a first node in a first peer-to-peer overlay network with a second peer-to-peer overlay network. The apparatus comprises means for receiving an advertisement from a selected node in the second overlay network, means for determining a size of the second overlay network, means for performing a self search on the second overlay network based on a persistent node identifier associated with the first node, if the size of the second overlay network is greater than a size of the first overlay network, and means for joining the second overlay network if the self search determines that the persistent node identifier is not part of the second overlay network.

In an aspect, a computer program product is provided for merging a first node in a first peer-to-peer overlay network with a second peer-to-peer overlay network. The computer program product comprises a computer-readable medium embodying codes executable by a processor to receive an advertisement from a selected node in the second overlay network, determine a size of the second overlay network, perform a self search on the second overlay network based on a persistent node identifier associated with the first node, if the size of the second overlay network is greater than a size of the first overlay network, and join the second overlay network if the self search determines that the persistent node identifier is not part of the second overlay network.

In an aspect, a method is provided for merging a first node in a first peer-to-peer overlay network with a second peer-to-peer overlay network. The method comprises receiving a first leave message from a second node in the first overlay network, receiving a first advertisement for a second overlay network from the second node, and joining the second overlay network utilizing the second node.

In an aspect, an apparatus is provided for merging a first node in a first peer-to-peer overlay network with a second peer-to-peer overlay network. The apparatus comprises a transceiver configured to receive a first leave message from a second node in the first overlay network and receive a first advertisement for a second overlay network from the second node, and a processor coupled to the transceiver and configured to join the second overlay network utilizing the second node.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects and implementations of an overlay merging system that operates to allow overlay networks to merge thereby providing participating nodes access to the resources and services of a more complete set of nodes.

Figure 1:
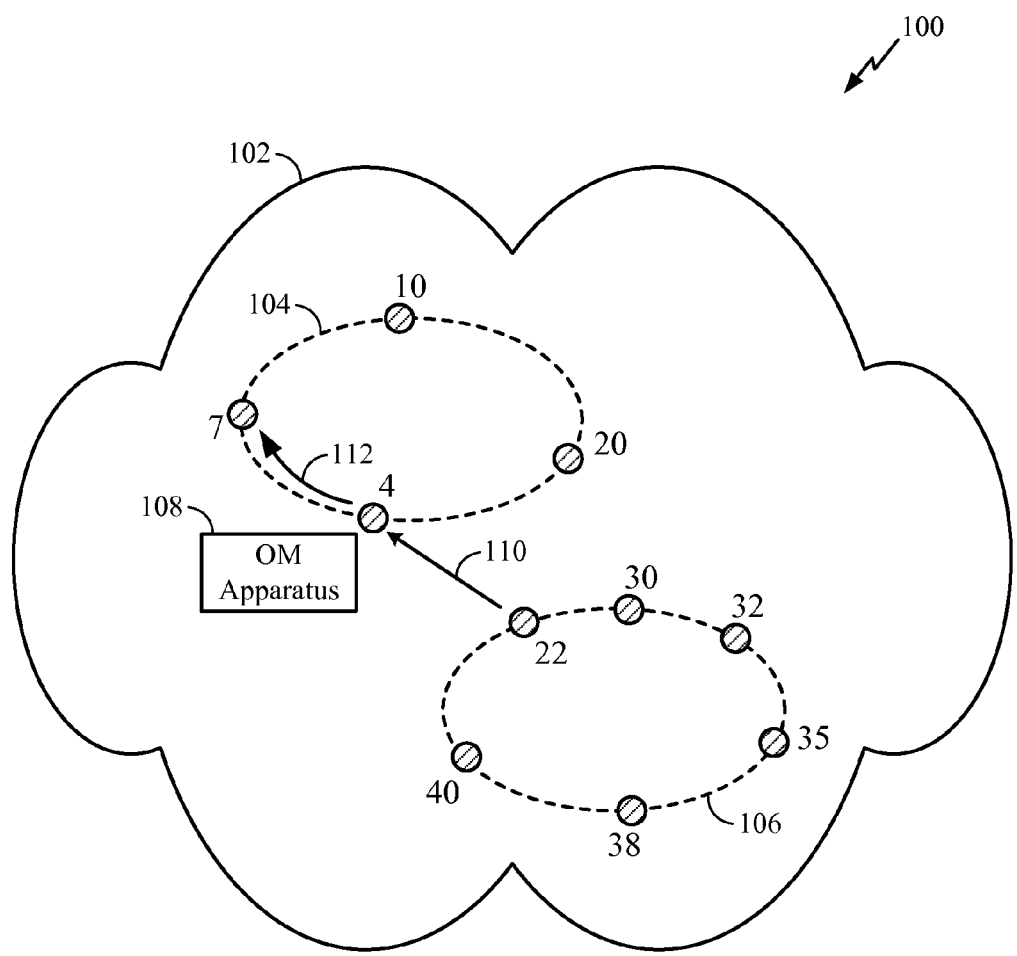
FIG. 1 shows a network that illustrates the operation of the overlay merging system.

FIG. 1 shows a network 100 that illustrates the operation of an overlay merging system. The network 100 includes an underlying network 102 which comprises any type of network, such as an Internet Protocol network that allows host to host communication among potentially routable hosts in that network. Although the underlying network 102 is shown as a single entity, the underlying network may comprise any number or types of networks such as WANs, LANs, wireless networks and/or any other type of network. It should also be noted that the merging system is operable to merge two overlay networks even if they are on different underlying networks, as long as there are points of connectivity between the two overlay networks.

A first peer-to-peer overlay network 104 comprises a subset of the nodes of the underlying network 102 and operates utilizing the services of the underlying network 102 to allow those nodes to communicate. A node comprises any type of wired or wireless device, such as a desktop computer, notebook computer, mobile phone, or any other device having a communication interface that allows it to communicate with other nodes. In the peer-to-peer overlay network 104, the nodes are connected by communication links to form a logically circular routing path such as those formed by structured DHTs. The communication links may also be secure tunnels provided by the underlying network 102. The peer-to-peer overlay network 104 operates with a set of permissions and interactions that are distinct from the underlying network 102. It should also be noted that the peer-to-peer overlay network 104 may have any topology or architecture to enable any routing pattern and it is not limited to the routing shown in FIG. 1.

A second peer-to-peer overlay network 106 comprises a subset of the nodes of the underlying network 102 and operates utilizing the services of the underlying network 102 to allow those nodes to communicate. The peer-to-peer overlay network 106 operates with a set of permissions and interactions that are distinct from the underlying network 102. It should also be noted that the peer-to-peer overlay network 106 may have any topology or architecture to enable any routing pattern and it is not limited to the routing shown in FIG. 1.

For this description it will be assumed that the overlay networks 104 and 106 have the same name and/or are created for the same intent or purpose. For example, the overlays 104 and 106 may have been created to allow participating nodes to exchange video clips, travel information, pictures or for any other purpose. The overlay creation process has resulted in two separate overlays being created. It would be desirable for these overlays to merge so that the participating nodes can access the resources and services of a more complete set of nodes. As described below, implementations of the overlay merging system allow the overlay networks 104 and 106 to merge in a simple but efficient manner.

Persistent Node Identifiers

Each of the nodes in the overlay networks 104 and 106 are assigned a persistent node identifier. For example, the persistent node identifiers for the nodes of the overlay network 104 are (4, 7, 10, and 20) and the persistent node identifiers for the nodes of the overlay network 106 are (22, 30, 32, 35, 38, and 40). The persistent node identifiers are assigned to each node by a trusted source. For example, the identifiers may be assigned by the node's manufacturer or a trusted third party may assign a persistent node identifier when the node is first activated. Each node uses its persistent node identifier to join and participate on any overlay network.

Thus, the persistent node identifiers are valid across different instances of overlays a node may be part of over time. Note that during merging, if the node identifiers need to be changed, it is almost certain that a large amount of the data will have to be moved. By making sure that the node identifiers for the overlay remain valid regardless of the particular instance of the overlay; the data movement during the merge process can be reduced.

To facilitate merging, an overlay merging apparatus is provided at each node. For simplicity and ease of description, an OM apparatus 108 is shown only at node 4. However, it should be noted that each node of the overlay networks 104 and 106 may comprises an OM apparatus. During operation, the OM apparatus 108 operates to provide one or more of the following functions in accordance with the merging system.

1. Receive an advertisement—Node 4 receives a link-local broadcast from node 22 comprising an advertisement of the overlay 106. For example, each node periodically (approximately every 60 seconds) sends out an overlay advertisement of its current overlay network. The advertisement identifies the overlay and contains the node's estimate of the size of the advertised overlay network.

2. Check routing state—A check is performed to determine if the sending node (i.e., node 22) is in the routing state information associated with Node 4. If not, a size comparison is performed.

3. Size Comparison—A size comparison is performed to determine if the size of the advertised overlay is greater than the size of the current overlay. For example, the OM apparatus 108 utilizes any suitable algorithm to estimate the network size of the overlay currently associated with Node 4. If the advertised overlay is larger than the current overlay, then a self search is performed.

4. Self Search—A self-search is initiated on the advertised overlay by node 4. For example, a lookup for node 4 on the advertised overlay is performed using node 22. This is accomplished by node 4 routing a message to itself and seeing if this message comes back to it from the overlay. This has the effect of determining whether node 4 is on the same overlay as node 22. If the self search determines that node 4 is not available on the advertised overlay network, then the OM apparatus 108 knows that the advertised overlay network represented by node 22 is different from the current overlay network associated with node 4.

5. Transmit Leave Message with Flag—In one implementation, a leave message 112 is transmitted to nodes in the overlay 104 from node 4 to indicate that node 4 is leaving the overlay 104. The leave message 112 comprises a flag that indicates the reason for leaving. Note that this message could be sent by node 4 to multiple nodes in the overlay 104. For example, node 4 could send the leave to its immediate logical neighbors in the overlay 104 for which it maintains routing state, such as by using a node identifier to IP address mapping in the case of 102 being an IP network. In another implementation, node 4 could also send the message to other nodes in overlay 102 for which it knows the node identifier to network identifier mapping. Typically, a node in an overlay network does not know how to directly communicate with all other nodes in the overlay since this is not scalable with increasing overlay network size. In one implementation, the flag indicates that node 4 is leaving the overlay 104 to merge with another overlay network. This information can be used by other nodes on the overlay 104 to determine whether or not they too should merge with the advertised overlay network and avoid the overhead of self search. A more detailed description of leave message processing is provided in another section of this document.

6. Merge with Advertised Network—Node 4 joins the advertised overlay network. Thus, the size comparison performed above operates to make sure that nodes from smaller overlay networks join larger overlay networks. Such a merging operation reduces data movement overhead in that fewer nodes are merged to form a single overlay network. The specific joining algorithm depends on the specific routing algorithm being used in the overlay network. Node 4 may, for example, route a join message to a successor node (where the successor is defined as the next largest node in the numerical identifier space).

7. Advertise Network—The network 106 is advertised by the node after joining. For example, node 4 advertises the network 106 after the merge is completed.

Therefore, the overlay merging system operates to allow nodes of a first overlay network to merge with a second and larger overlay network. Although described with reference to node 4, the above operations can be performed by all the nodes in the overlay network 104 so that these nodes all merge with the overlay network 106 to form a single overlay network. Because nodes of smaller overlay networks are merged into larger overlay networks, data movement overhead is reduced.

Figure 2:
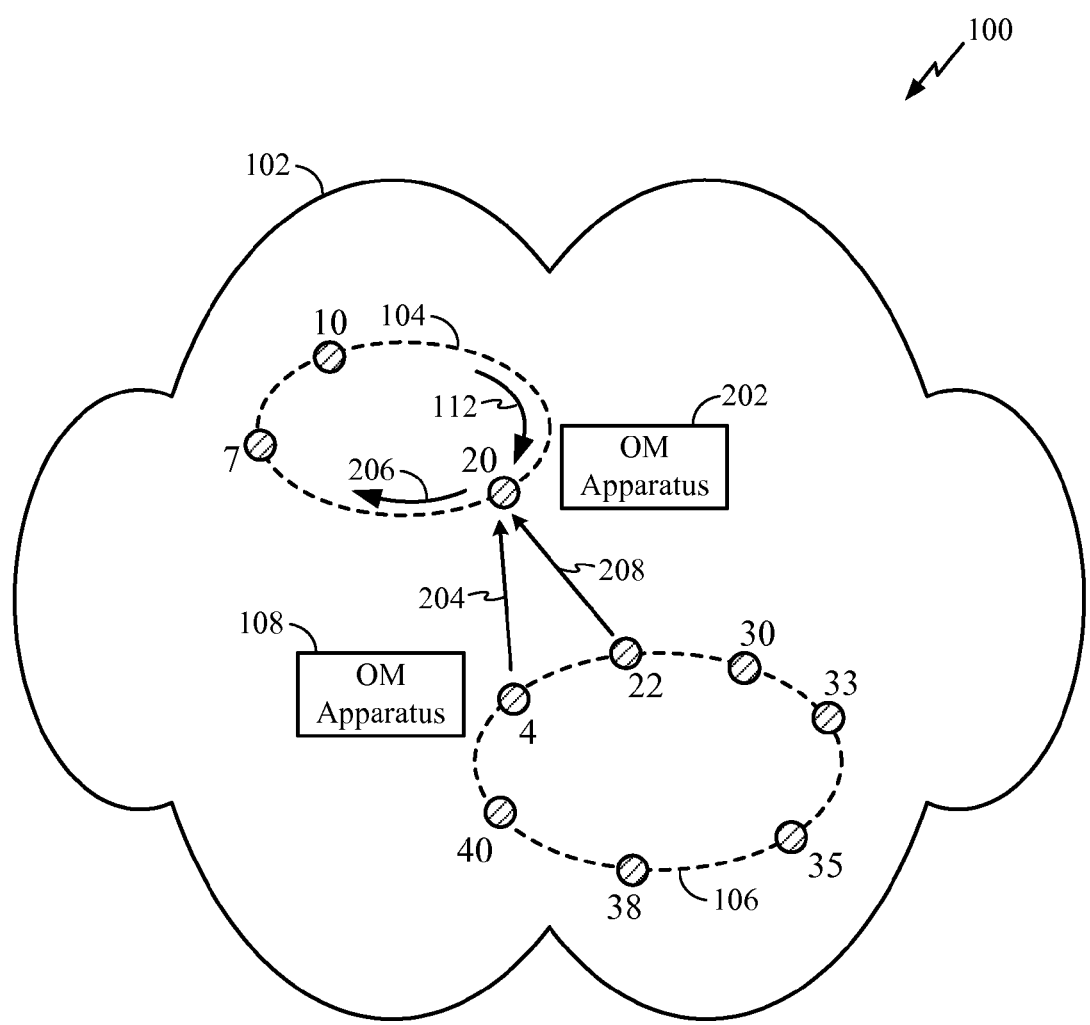
FIG. 2 shows the network of FIG. 1 after a merging operation is performed by the overlay merging system.

FIG. 2 shows the network 100 after the operation of the overlay merging system as described with reference to FIG. 1. The node 4 is now merged in the overlay network 106. The overlay network 104 is also now reduced in size. Because of the use of the persistent node identifiers, the amount of data movement overhead required for the merging process has been minimized since some of the data owned by node 4 remains with it in the new overlay i.e. the data named between numerical identifiers 40 and 4 in this specific example In one implementation, the leave message 112 transmitted by node 4 in the overlay network 104 is received by node 20. The node 20 comprises OM apparatus 202. The OM apparatus 202 at node 20 performs one or more of the following operations.

1. Receive a leave message—Node 20 receives the leave message 112 transmitted from node 4. The leave message 112 comprises a flag indicating that node 4 left the overlay network 104 to merge with another overlay network.

2. Receive an advertisement—Node 20 receives an advertisement from node 4 that advertises the overlay network 106. For example, after node 4 joins the overlay network 106, node 4 periodically (approximately every 60 seconds) sends out an overlay advertisement advertising the overlay network 106. The advertisement identifies the overlay network 106 and contains an estimate of the size of the overlay network 106. The advertisement may be received by node 20 utilizing a previously established communication link with node 4. Note that receiving an advertisement will typically entail being in physical proximity to a node because such advertisements are typically broadcast.

3. Transmit Leave Message with Flag—In one implementation, the OM apparatus 202 operates to determine that node 4 left the overlay 104 to merge with the overlay 106. The OM apparatus 202 determines that a self search by node 20 on the overlay network 106 need not be performed since node 4 has already determined that the overlay network 106 is separate and distinct from the overlay 104. Thus, the OM apparatus 202 determines that node 20 should also merge with the overlay network 106. The OM apparatus 202 generates a leave message 206 that is transmitted to nodes in the overlay 104 from node 20 to indicate that node 20 is leaving the overlay 104. The leave message 206 comprises a flag that indicates the reason for leaving. In one implementation, the flag indicates that node 20 is leaving the overlay 104 to merge with another overlay network. The leave message implies the fact that the overlay network of node 20 is smaller than the other overlay network and thus size estimates need not be included in the leave message. The leave message also contains the configuration data of the new overlay which node 4 joined. The overlay configuration data could contain the name of the overlay for example.

4. Merge with Advertised Network—Node 20 joins the advertised overlay network 106 utilizing its connection to node 4.

5. Advertise Network—The overlay network 106 is advertised by node 20 after joining. For example, node 20 advertises the network 106 after the merge is completed.

It should also be noted that the node 20 may receive an advertisement 206 directly from the node 22 in the overlay network 106. The OM apparatus 202 at node 20 may also perform operations similar to those performed by node 4 described above to join the overlay network 106. Note that node 20 will utilize the fact that it received a leave from node 4 (specifying overlay 106 as an overlay to join) and thus joining overlay 106 through node 22 without doing a self search.

Figure 3:
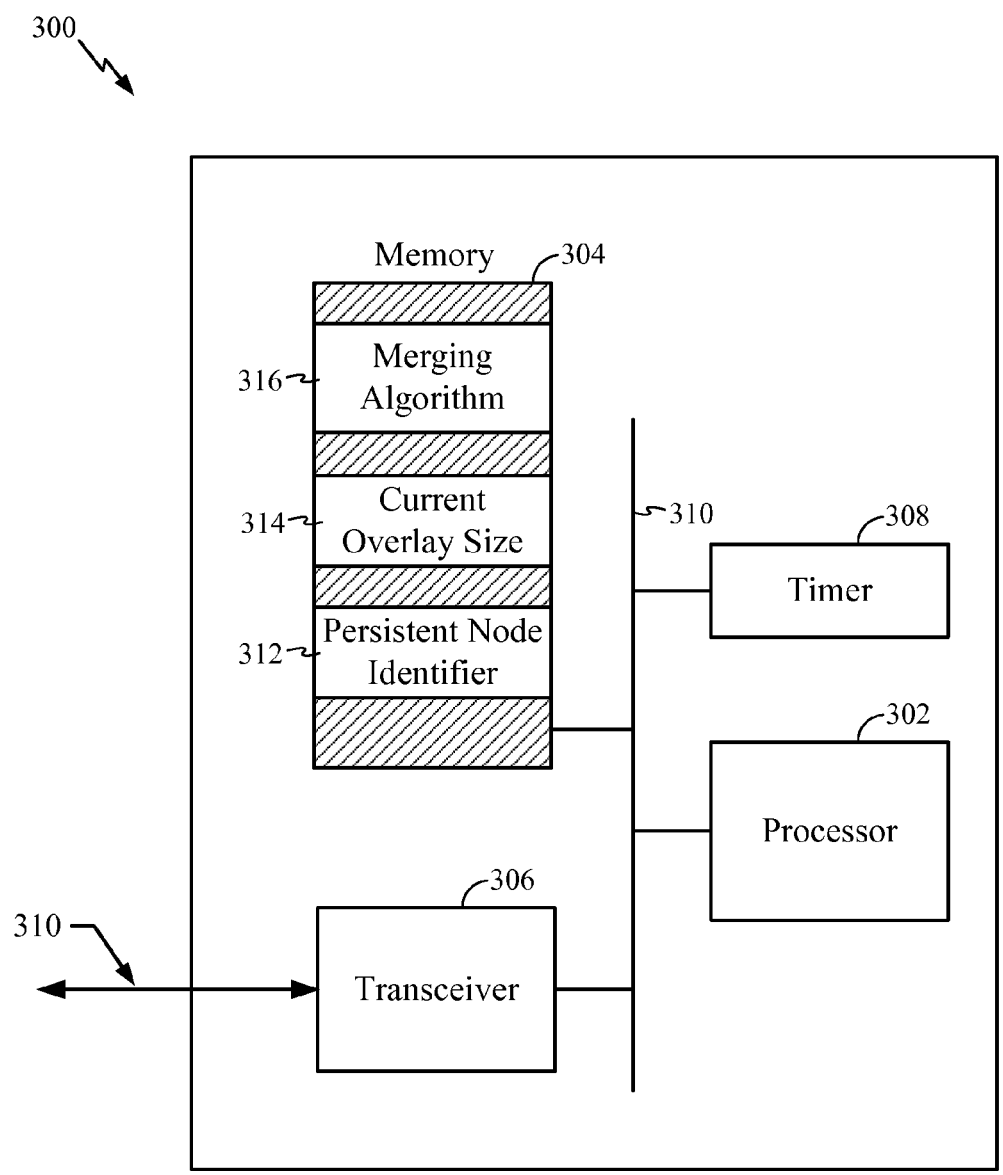
FIG. 3 shows an exemplary OM apparatus constructed in accordance with the overlay merging system.

FIG. 3 shows an exemplary OM apparatus 300 constructed in accordance with the overlay merging system. For example, the OM apparatus 300 is suitable for use as the OM apparatus 108 shown in FIG. 1 or 202 shown in FIG. 2. The OM apparatus 300 comprises processor 302, memory 304, transceiver 306, and timer 308 all coupled to communicate using data bus 310. It should be noted that the OM apparatus 300 is just one implementation and that other implementations are possible.

The transceiver 306 comprises hardware and/or hardware executing software that operate to allow the OM apparatus 300 to communicate data or other information with nodes on a first peer-to-peer overlay network. The transceiver 306 comprises transmit and receive logic to communicate over one or more communication links 310. The transceiver 306 is also operable to transmit or receive advertisements and/or other information to/from nodes on a second peer-to-peer overlay network using one or more communication links. For example, the communication links comprise wired or wireless links, such as WiFi, Bluetooth or any other type of communication link.

The memory 304 comprises any suitable storage device operable to allow the storage and retrieval of information during operation of the merging system. The memory 304 operates to store a persistent node identifier 312 that is used by a node to join and participate in one or more overlay networks. In one implementation, the persistent node identifier 312 is provided during manufacture or by a trusted third party. For example, in one implementation, the processor obtains the persistent node identifier from a trusted source or third party.

The memory 304 also comprises a current overlay size parameter 314. The current overlay size is determined using any suitable method or algorithm and the result is stored in the memory 304. The algorithm may be repeated periodically and the result in memory updated accordingly.

The memory 304 also operates to store a merging algorithm 316 that comprises instructions or codes executable by the processor 302 to provide the functions of the overlay merging system described herein.

The timer 308 comprises hardware and/or hardware executing software that operates to measure a backoff time interval based on time parameters received from the processor 302. For example, the time parameters include a count down value that is used to initialize a counter. The count down value corresponds to a particular backoff time interval to be measured by the timer 308. Thus, the processor 302 may set the timer 308 to measure any desirable backoff time interval. In one implementation, the processor 302 generates time parameters to configure the backoff time interval to be random. When the backoff time interval has been measured, the timer 308 indicates timer expiration to the processor 302. For example, the timer 308 measures a particular backoff time interval, at the end of which, the processor 302 is notified and thereafter operates to perform other operations in accordance with the overlay merging system. Further description of the use of the backoff time interval is provided below.

The processor 302 comprises at least one of a CPU, processor, gate array, hardware logic, memory elements, and/or hardware executing software. The processor 302 operates to receive and transmit advertisements, transmit leave messages and join and participate on overlay networks using the persistent node identifier 312. In one implementation, the processor 302 executes the codes of the merging algorithm 316 to control the elements of the OM apparatus 300 to perform the functions of the overlay merging system as described herein.

In one implementation, the overlay merging system comprises a computer program product having one or more program instructions ("instructions") or sets of "codes" stored or embodied on a computer-readable medium. When the codes are executed by at least one processor, for instance, the processor 302, their execution causes the OM apparatus 300 to provide the functions of the overlay merging system described herein. For example, the computer-readable medium comprises a floppy disk, CDROM, memory card, FLASH memory device, RAM, ROM, or any other type of memory device or computer-readable medium that interfaces to the OM apparatus 300. In another aspect, the sets of codes may be downloaded into the OM apparatus 300 from an external device or communication network resource. The sets of codes, when executed, operate to provide aspects of the overlay merging system as described herein.

Figure 4:
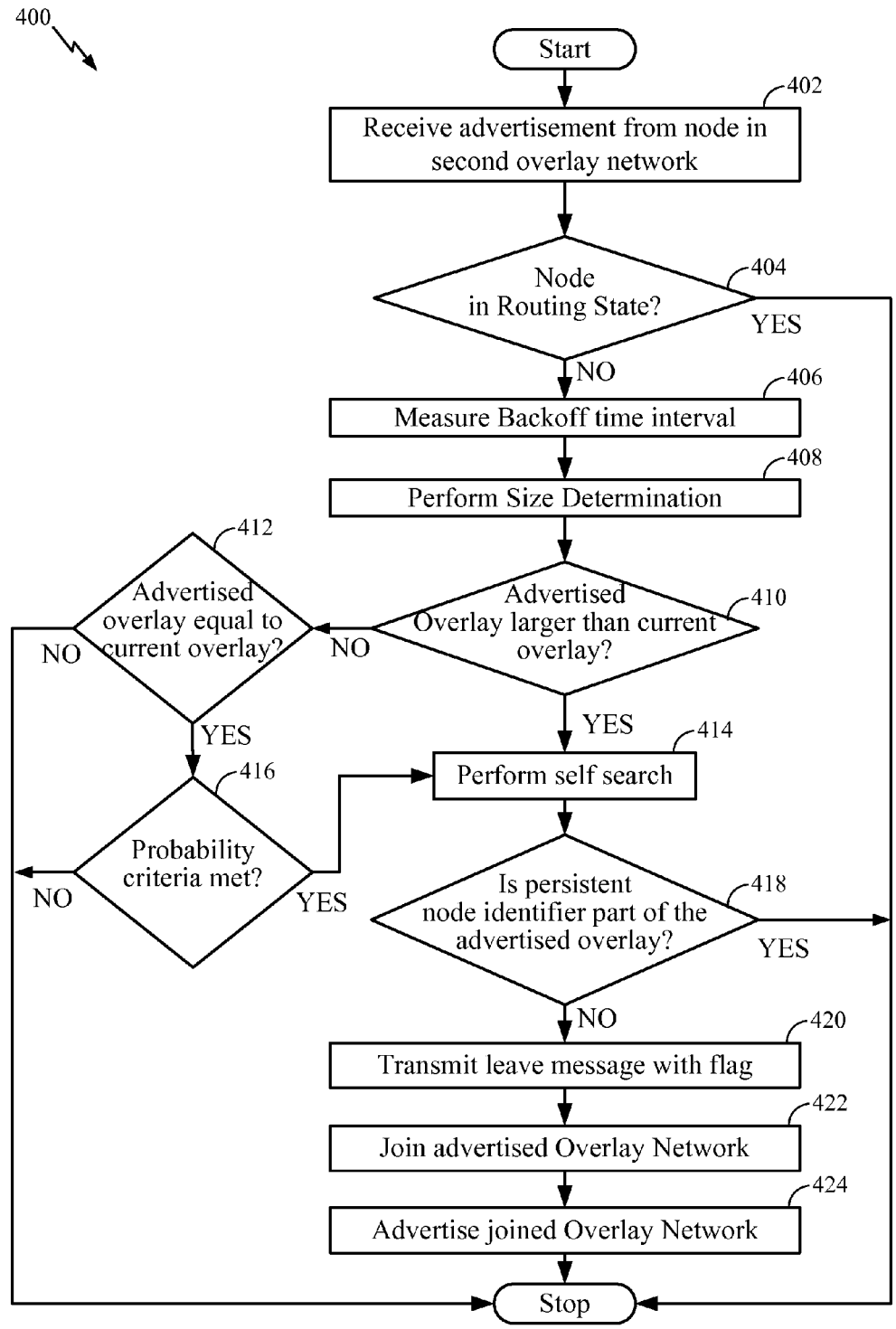
FIG. 4 shows an exemplary method for merging overlay networks in accordance with the overlay merging system.

FIG. 4 shows an exemplary method 400 for merging overlay networks in accordance with the overlay merging system. For clarity, the method 400 is described below with reference to the OM apparatus 300 shown in FIG. 3. For example, the OM apparatus 300 is located at a node in a first overlay network and performs the following functions to merge with a second overlay network. In one implementation, the processor 302 executes one or more sets of codes to control the OM apparatus 300 to perform the functions described below.

At block 402, an advertisement is received from a node in a second overlay network. In one implementation, the transceiver 306 operates to receive the advertisement.

At block 404, a determination is made as to whether the node transmitting the advertisement is in the routing state associated with a first overlay network. In one implementation, the processor 302 maintains routing state and determines if the node transmitting the advertisement is in the routing state associated with the first overlay network. If the node is in the routing state, the method ends. If the node is not in the routing state, the method proceeds to block 406.

At block 406, a backoff time interval is measured. The backoff time interval may be a random time interval that is measured to provide a delay before further processing thereby avoiding conflicts between nodes which may be attempting merging functions at the same time. For example, two nodes on different overlay networks may receive each other's advertisements at approximately the same time and attempt to determine whether to merge into each other's overlay networks at the same time. Thus, it is possible that oscillatory merging behavior may occur. To avoid this potential conflict, a randomize backoff time interval is used at each node so that each node will wait for a selected time interval before attempting the merging operations. Therefore, one node will have the opportunity to act before the other. This operates to prevent oscillatory behavior when the merging overlay networks are close in size. In one implementation, the processor 302 controls the time 308 to measure the backoff time interval.

At block 408, a size determination is performed to determine the size of the first overlay network. For example, the processor 302 operates to perform any desired algorithm to determine the size of the first overlay network.

At block 410, a determination is made as to whether the advertised (i.e., second) overlay network is larger than the first overlay network. For example, the processor 302 compares the size determination of the first overlay network with the size of the advertised overlay network obtained from the received advertisement. If the advertised overlay network is not larger than the first overlay network, the method proceeds to block 412. If the advertised overlay network is larger than the first overlay network, the method proceeds to block 414.

At block 412, a determination is made as to whether the advertised overlay network is substantially equal in size to the first overlay network. The processor 302 makes this determination. If the advertised overlay network is substantially equal in size to the first overlay network, the method proceeds to block 416. If the advertised overlay network is not substantially equal in size to the first overlay network, the method ends.

At block 416, a determination is made as to whether probability criteria are met. In one implementation, selected probability criteria are established to control whether merging occurs if the size of the first overlay network is approximately the same as the size of the advertised overlay network. Any suitable probability criteria may be established. The processor 302 operates to maintain the probability criteria and make this determination. If the probability criteria are met, the method proceeds to block 414. If the probability criteria are not met, the method ends.

At block 414, a self search is performed on the advertised network to determine if a persistent node identifier is accessible. In one implementation, the processor 302 uses the persistent node identifier of the node in the first overlay network and attempts to access that node on the advertised overlay network. If the persistent node identifier is accessible on the advertised network, the access attempt will be received by the processor 302.

At block 418, a determination is made as to whether the persistent node identifier is accessible. If the persistent node identifier is located on the advertised network, the access attempt will be received by the processor 302. If the persistent node identifier is accessible, the method ends. If the persistent node identifier is not accessible, the method proceeds to block 420.

At block 420, a leave message is transmitted on the first overlay network. In one implementation, the processor 302 controls the transceiver 306 to transmit the leave message. The leave message comprises a flag that indicates that the reason the node is leaving is to merge with another overlay network. This leave message acts as a trigger for the other nodes in the smaller overlay network to start joining the larger overlay network. This process continues until the two overlay networks are merged.

At block 422, the advertised overlay network is joined. In one implementation, the processor 302 controls the transceiver 306 to communicate with the node transmitting the advertisement so that the node in the first overlay network may join the advertised overlay network.

At block 424, the joined overlay network is advertised. In one implementation, the processor 302 controls the transceiver 308 to transmit an advertisement that advertises the newly joined overlay network.

Therefore, the method 400 can be performed by OM apparatus located at a node in a first overlay network to enable the node to merge with a second overlay network. It should be noted that the method 400 is just one implementation and that the operations of the method 400 may be rearranged or otherwise modified within the scope of the various implementations. Thus, other implementations are possible.

Figure 5:
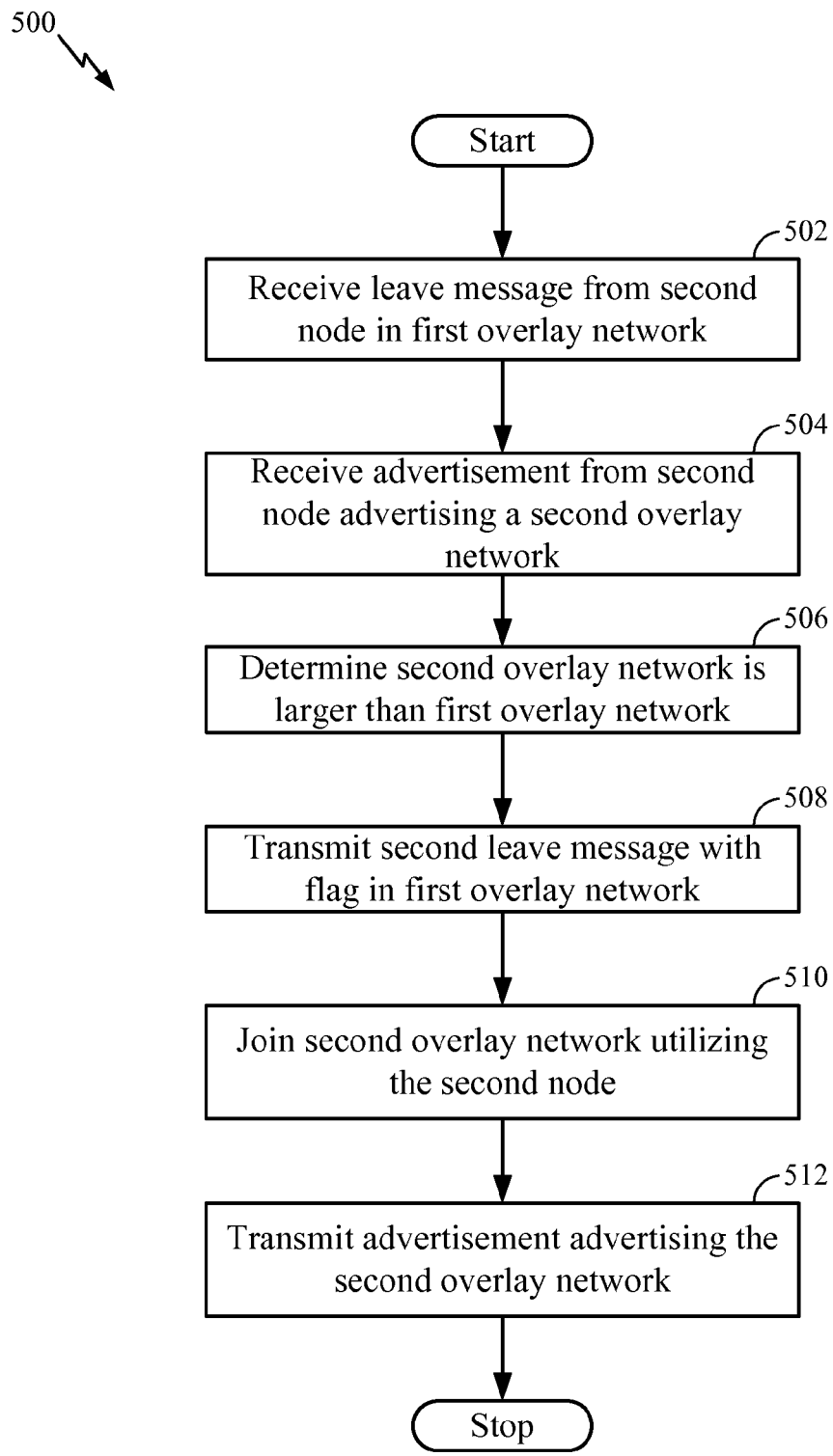
FIG. 5 shows an exemplary overlay merging apparatus constructed in accordance with the overlay merging system.

FIG. 5 shows an exemplary method 500 for merging overlay networks in accordance with the overlay merging system. For clarity, the method 500 is described below with reference to the OM apparatus 300 shown in FIG. 3. For example, the OM apparatus 300 is located at a first node in a first overlay network and performs the following functions to join a second overlay network. In one implementation, the processor 302 executes one or more sets of codes to control the OM apparatus 300 to perform the functions described below.

At block 502, a leave message is received from a second node in a first overlay network. In one implementation, the transceiver 306 receives the leave message and passes it to the processor 302.

At block 504, an advertisement is received from the second node advertising a second overlay network. In one implementation, the transceiver 306 receives the leave message and passes it to the processor 302.

At block 506, a determination is made that the second overlay network is larger than the first overlay network based on the received advertisement. For example, because the second node left the first overlay network and now advertises the second overlay network, it is determined that the second node determined that the second overlay network was larger than the first and joined the second overlay network. The processor 302 makes this determination.

At block 508, a second leave message is transmitted on the first overlay network. For example, the first node on the first overlay network transmits the second leave message comprises a flag indicating the reason for leaving. In one implementation, the processor 302 generates the leave message and controls the transceiver 306 to transmit the leave message on the first overlay network.

At block 510, the first node joins the second overlay network utilizing the second node. In one implementation, the processor 302 controls the transceiver 306 to communicate with the second node to join the second overlay network.

At block 512, an advertisement for the second overlay network is transmitted by the first node. In one implementation, the processor 302 controls the transceiver 306 to transmit the advertisement advertising the second overlay network.

Therefore, the method 500 can be performed by OM apparatus located at a first node in a first overlay network to enable the node to join with a second overlay network utilizing a second node. It should be noted that the method 500 is just one implementation and that the operations of the method 500 may be rearranged or otherwise modified within the scope of the various implementations. Thus, other implementations are possible.

Figure 6:
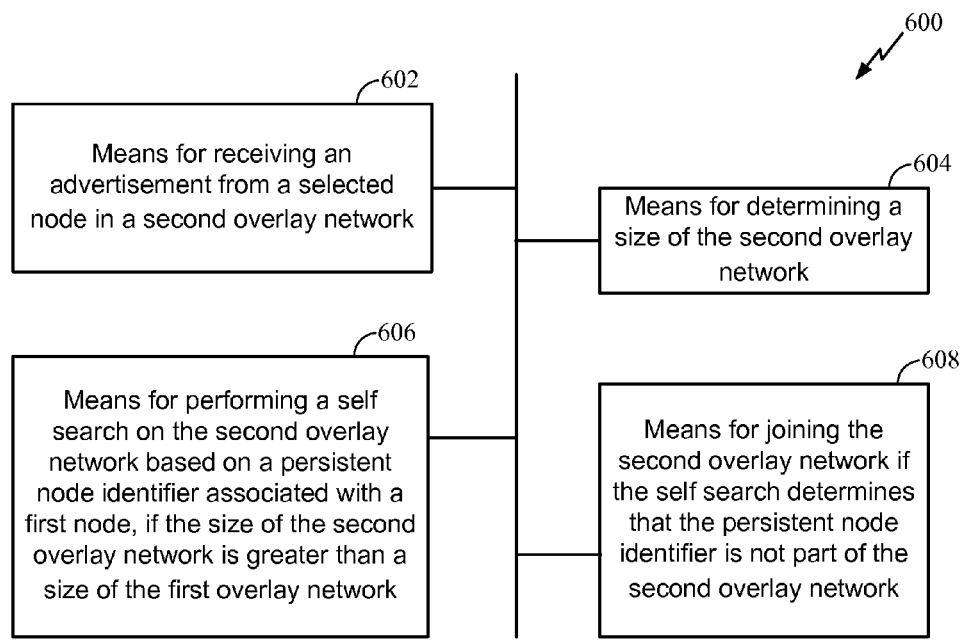
FIG. 6 shows an exemplary OM apparatus constructed in accordance with the overlay merging system.

FIG. 6 shows an exemplary OM apparatus 600 constructed in accordance with the overlay merging system. For example, the OM apparatus 600 is suitable for use as the OM apparatus 300 shown in FIG. 3. In an aspect, the OM apparatus 600 is implemented by at least one integrated circuit comprising one or more modules configured to provide aspects of an overlay merging system as described herein. For example, in one implementation, each module comprises hardware and/or hardware executing software.

The OM apparatus 600 comprises a first module comprising means (602) for receiving an advertisement from a selected node in a second overlay network, which in an aspect comprises the transceiver 306. The OM apparatus 600 also comprises a second module comprising means (604) for determining a size of the second overlay network, which in an aspect comprises the processor 302. The OM apparatus 600 also comprises a third module comprising means (606) for performing a self search on the second overlay network based on a persistent node identifier associated with a first node, if the size of the second overlay network is greater than a size of the first overlay network, which in an aspect comprises the processor 302. The OM apparatus 600 also comprises a fourth module comprising means (608) for joining the second overlay network if the self search determines that the persistent node identifier is not part of the second overlay network, which in an aspect comprises the processor 302.

Figure 7:
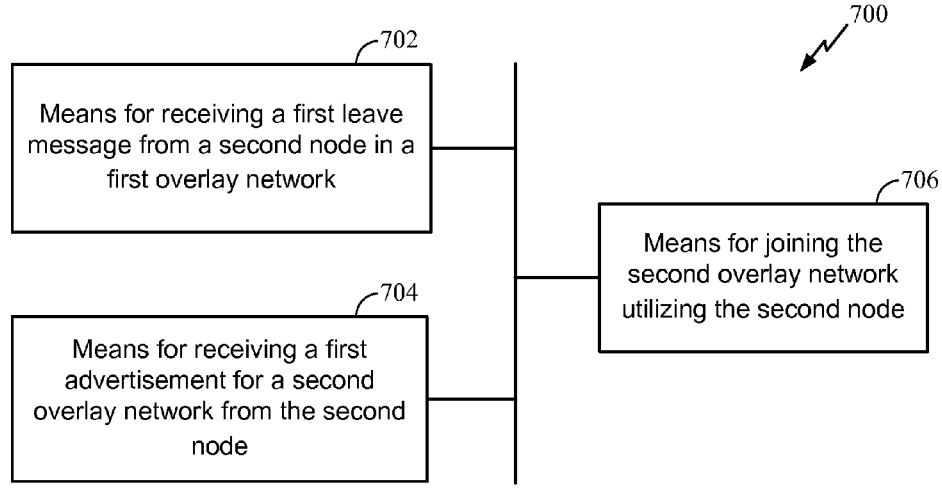
FIG. 7 shows an exemplary OM apparatus constructed in accordance with the overlay merging system.

FIG. 7 shows an exemplary OM apparatus 700 constructed in accordance with the overlay merging system. For example, the OM apparatus 700 is suitable for use as the OM apparatus 300 shown in FIG. 3. In an aspect, the OM apparatus 700 is implemented by at least one integrated circuit comprising one or more modules configured to provide aspects of an overlay merging system as described herein. For example, in one implementation, each module comprises hardware and/or hardware executing software.

The OM apparatus 700 comprises a first module comprising means (702) for receiving a first leave message from a second node in a first overlay network, which in an aspect comprises the transceiver 306. The OM apparatus 700 also comprises a second module comprising means (704) for receiving a first advertisement for a second overlay network from the second node, which in an aspect comprises the transceiver 306. The OM apparatus 700 also comprises a third module comprising means (706) for joining the second overlay network utilizing the second node, which in an aspect comprises the processor 302.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of an overlay merging system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for merging a first node in a first peer-to-peer overlay network with a second peer-to-peer overlay network, the method comprising:
   receiving an advertisement from a selected node in the second overlay network;
   determining a size of the second overlay network;
   performing a self search on the second overlay network based on a persistent node identifier associated with the first node, if the size of the second overlay network is greater than a size of the first overlay network; and
   joining the second overlay network if the self search determines that the persistent node identifier is not part of the second overlay network.

2. The method of claim 1, further comprising obtaining the persistent node identifier from a trusted source.

3. The method of claim 1, wherein said joining comprises transmitting a leave message to nodes on the first overlay network, wherein the leave message comprises a merge flag indicating a reason for leaving and an overlay name identifying an overlay for joining.

4. The method of claim 1, wherein said joining comprises joining the second overlay based on a probability criteria, if the size of the second overlay network is approximately equal to the size of the first overlay network.

5. The method of claim 1, further comprising measuring a backoff time interval prior to said operation of performing to prevent oscillatory merging behavior.

6. The method of claim 1, wherein said determining comprises obtaining the size of the second overlay network from the advertisement.

7. The method of claim 1, wherein said performing comprises attempting to access the persistent node identifier on the second overlay network.

8. The method of claim 1, wherein the first node is a portable device.

9. An apparatus for merging a first node in a first peer-to-peer overlay network with a second peer-to-peer overlay network, the apparatus comprising:
   a transceiver configured to receive an advertisement from a selected node in the second overlay network; and
   a processor coupled to the transceiver and configured to:
   determine a size of the second overlay network;
   perform a self search on the second overlay network based on a persistent node identifier associated with the first node, if the size of the second overlay network is greater than a size of the first overlay network; and
   join the second overlay network if the self search determines that the persistent node identifier is not part of the second overlay network.

10. The apparatus of claim 9, wherein said processor is configured to obtain the persistent node identifier from a trusted source.

11. The apparatus of claim 9, wherein said processor is configured to transmit a leave message to nodes on the first overlay network, wherein the leave message comprises a merge flag indicating a reason for leaving and an overlay name identifying an overlay for joining.

12. The apparatus of claim 9, wherein said processor is configured to join the second overlay based on a probability criteria, if the size of the second overlay network is approximately equal to the size of the first overlay network.

13. The apparatus of claim 9, further comprising a timer configured to measure a backoff time interval prior to said operation of performing to prevent oscillatory merging behavior.

14. The apparatus of claim 9, wherein said processor is configured to obtain the size of the second overlay network from the advertisement.

15. The apparatus of claim 9, wherein said processor is configured to perform the self search by attempting to access the persistent node identifier on the second overlay network.

16. The apparatus of claim 9, wherein the first node is a portable device.

17. An apparatus for merging a first node in a first peer-to-peer overlay network with a second peer-to-peer overlay network, the apparatus comprising:
   means for receiving an advertisement from a selected node in the second overlay network;
   means for determining a size of the second overlay network;
   means for performing a self search on the second overlay network based on a persistent node identifier associated with the first node, if the size of the second overlay network is greater than a size of the first overlay network; and means for joining the second overlay network if the self search determines that the persistent node identifier is not part of the second overlay network.

18. The apparatus of claim 17, further comprising means for obtaining the persistent node identifier from a trusted source.

19. The apparatus of claim 17, wherein said means for joining comprises means for transmitting a leave message to nodes on the first overlay network, wherein the leave message comprises a merge flag indicating a reason for leaving and an overlay name identifying an overlay for joining.

20. The apparatus of claim 17, wherein said means for joining comprises means for joining the second overlay based on a probability criteria, if the size of the second overlay network is approximately equal to the size of the first overlay network.

21. The apparatus of claim 17, further comprising means for measuring a backoff time interval prior to said operation of performing to prevent oscillatory merging behavior.

22. The apparatus of claim 17, wherein said means for determining comprises means for obtaining the size of the second overlay network from the advertisement.

23. The apparatus of claim 17, wherein said means for performing comprises means for attempting to access the persistent node identifier on the second overlay network.

24. The apparatus of claim 17, wherein the first node is a portable device.

25. A computer program product for merging a first node in a first peer-to-peer overlay network with a second peer-to-peer overlay network, the computer program product comprising:

a non-transitory computer-readable medium embodying codes executable by a processor to:

receive an advertisement from a selected node in the second overlay network;

determine a size of the second overlay network;

perform a self search on the second overlay network based on a persistent node identifier associated with the first node, if the size of the second overlay network is greater than a size of the first overlay network; and join the second overlay network if the self search determines that the persistent node identifier is not part of the second overlay network.

26. The computer program product of claim 25, wherein said codes are configured to cause the processor to obtain the persistent node identifier from a trusted source.

27. The computer program product of claim 25, wherein said codes are configured to cause the processor to transmit a leave message to nodes on the first overlay network, wherein the leave message comprises a merge flag indicating a reason for leaving and an overlay name identifying an overlay for joining.

28. The computer program product of claim 25, wherein said codes are configured to cause the processor to join the second overlay based on a probability criteria, if the size of the second overlay network is approximately equal to the size of the first overlay network.

29. The computer program product of claim 25, wherein said codes are configured to cause the processor to measure a backoff time interval prior to said operation of performing to prevent oscillatory merging behavior.

30. The computer program product of claim 25, wherein said codes are configured to cause the processor to obtain the size of the second overlay network from the advertisement.

31. The computer program product of claim 25, wherein said codes are configured to cause the processor to perform the self search by attempting to access the persistent node identifier on the second overlay network.

32. The computer program product of claim 25, wherein the first node is a portable device.

* * * * *